United States Patent
Hampel et al.

(10) Patent No.: US 6,573,673 B1
(45) Date of Patent: Jun. 3, 2003

(54) ADJUSTABLE VEHICLE SEAT WITH HORIZONTAL SEAT ADJUSTMENT AND/OR SEAT HEIGHT ADJUSTMENT AND/OR SEAT DEPTH ADJUSTMENT AND NECK-REST THAT CAN BE DISPLACED BY AN ELECTRIC MOTOR AND GUIDED BY A SENSOR SYSTEM INFLUENCED BY THE SIZE OF THE USER

(75) Inventors: Klaus Hampel, Coburg (DE); Anja Kliose, Coburg (DE); Gerhard Juerjens, Coburg (DE); Heinz Kaesling, Grub am Forst (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/701,028

(22) PCT Filed: May 18, 1999

(86) PCT No.: PCT/DE99/01526
§ 371 (c)(1),
(2), (4) Date: Nov. 20, 2000

(87) PCT Pub. No.: WO99/59835
PCT Pub. Date: Nov. 25, 1999

(30) Foreign Application Priority Data

May 20, 1998 (DE) .......................................... 198 23 661

(51) Int. Cl.[7] ................................................. B60N 2/48
(52) U.S. Cl. ....................................... 318/265; 318/266
(58) Field of Search ................................ 318/264, 265, 318/266, 286, 466, 467, 468; 388/907.5

(56) References Cited

U.S. PATENT DOCUMENTS

| 4,645,233 A | 2/1987 | Bruse et al. ................. 280/808 |
| 4,669,780 A | * 6/1987 | Sakakibara et al. .......... 297/257 |
| 4,797,824 A | * 1/1989 | Sugiyama et al. ...... 364/424.05 |
| 4,809,180 A | * 2/1989 | Sitoh ...................... 364/424.05 |
| 4,811,226 A | * 3/1989 | Shinohara ............... 364/424.05 |
| 4,857,812 A | * 8/1989 | Mochizuki et al. ............ 318/15 |
| 4,935,680 A | * 6/1990 | Sugiyama .................... 318/567 |
| 5,019,759 A | * 5/1991 | Takemura et al. ........... 318/466 |
| 5,095,257 A | * 3/1992 | Ikeda et al. .............. 318/568.1 |

(List continued on next page.)

FOREIGN PATENT DOCUMENTS

| DE | 31 36 648 | 3/1983 |
| DE | 32 40 294 | 5/1984 |
| DE | 37 30 210 | 3/1989 |
| DE | 42 28 849 | 10/1993 |
| DE | 43 25 996 | 2/1995 |
| DE | 19519619 A1 * | 5/1996 |
| DE | 195 22 897 | 1/1997 |
| DE | 196 51 670 | 2/1998 |
| EP | 0 761 494 | 3/1997 |
| GB | 2320426 A * | 6/1998 |

*Primary Examiner*—Bentsu Ro
(74) *Attorney, Agent, or Firm*—Christie, Parker & Hale, LLP

(57) ABSTRACT

The invention relates to an adjustable motor vehicle seat with at least one of a horizontal seat adjustment, a seat height adjustment, a seat depth adjustment, and a seat back adjustment, as well as with a neck rest that is adjustable by an electric motor and guided by at least one sensor unit which is influenced by the size of the user, wherein the neck rest adjustment is controlled by an electronics unit which evaluates the sensor signals. An object of the present invention is to provide an economical vehicle seat which is independent of the level of equipment of the vehicle, wherein the neck rest is moved automatically in dependence on sensed parameters which take into account the body size of the user. This is achieved in that the electronics unit is mounted in the region of the neck rest which is adjustable by electric motor.

12 Claims, 2 Drawing Sheets

U.S. PATENT DOCUMENTS

| | | | | |
|---|---|---|---|---|
| 5,097,185 A | * | 3/1992 | Ogasawara | 318/590 |
| 5,222,784 A | | 6/1993 | Hamelin | 297/408 |
| 5,848,661 A | | 12/1998 | Fu | 180/273 |
| 5,882,060 A | * | 3/1999 | Walk et al. | 296/65.01 |
| 5,975,637 A | * | 11/1999 | Geuss et al. | 297/391 |
| 5,993,015 A | * | 11/1999 | Fredricks | 359/843 |
| 6,042,145 A | | 3/2000 | Mitschelen et al. | 280/735 |
| 6,055,473 A | * | 4/2000 | Zwolinski et al. | 701/49 |
| 6,074,011 A | * | 6/2000 | Ptak et al. | 297/408 |
| 6,078,854 A | * | 6/2000 | Breed et al. | 701/49 |
| 6,176,587 B1 | * | 1/2001 | Fredricks | 359/843 |
| 6,242,701 B1 | * | 6/2001 | Breed et al. | 177/144 |

\* cited by examiner a)

b)

c)

d)

ADJUSTABLE VEHICLE SEAT WITH HORIZONTAL SEAT ADJUSTMENT AND/OR SEAT HEIGHT ADJUSTMENT AND/OR SEAT DEPTH ADJUSTMENT AND NECK-REST THAT CAN BE DISPLACED BY AN ELECTRIC MOTOR AND GUIDED BY A SENSOR SYSTEM INFLUENCED BY THE SIZE OF THE USER

FIELD OF THE INVENTION

The invention relates to an adjustable vehicle seat with a horizontal seat adjustment and/or seat height adjustment and/or seat cushion depth adjustment as well as with a neck rest movable by an electric motor and guided by a sensor system which is influenced by the size of the user.

BACKGROUND OF THE INVENTION

From DE 43 25 996 A1 an adjustment device is known for a motorized adjustable neck rest of a motor vehicle seat wherein the neck rest, which is fixed on guide rods and guided in guide sleeves, is coupled to a motor through an adjustment gearing. All of the parts of the adjustment device are thereby mounted in the upper region of a backrest body between the guide rods.

An adjustment of a neck rest of this kind is thereby carried out either by manually operating switches or by means of a memory function.

From DE 195 22 897 A1 an adjustable vehicle seat is known that has several motor driven adjustment devices where in dependence on the displacement of one adjustment device the remaining seat adjustment devices are moved by a control device automatically corresponding to memorized characteristics.

It is an often observed fact that little attention is paid to adjusting neck rests so that the risk of injury is considerably increased. The correct position of the neck rest is of crucial importance however, particularly in the event of rear-end collisions, and can prevent serious injuries.

On the other hand, the optimum position of the neck rest set in respect of safety requirements, can in certain situations be a hindrance, for example, during reversing, or when a backrest or seat is folded down in order to get in and out of the vehicle. In these cases a manual adjustment, or operation of a switch, has to be carried out.

An automatic adjustment of the adjustment elements of a vehicle seat, which also include those of the neck rest, through a memory function has been an expensive accessory item up until now. A memory seat of this kind stores the positions of the existing adjustment elements and starts them up when necessary. In this way it is possible to produce the optimum adjustment of the neck rest. Drawbacks with a seat of this kind however, are the relatively high weight as a result of the numerous adjustable adjustment elements, and high costs, so that this solution is only to be found in higher priced vehicle models. Furthermore, the positions that are to be memorized are set by a vehicle user so that errors can arise when adjusting the neck rest even when the positions are stored.

From DE 32 40 291 A 1 a device is known for adjusting the height of a neck rest which has an electric adjustment drive for adjusting the position of the neck rest. In order to move the neck rest into a position adapted to the seat user, a measuring device is mounted on the neck rest and interacts with a switch device. The measuring device determines the height of the seat user at a certain body point, such as for example a boundary line of the shoulders or head, as a value which is supplied to the adjustment drive in order to control the adjustment of the neck rest position.

SUMMARY OF THE INVENTION

Starting from the knowledge that the correct adjustment of the neck rest provides a critical safety function in a motor vehicle, the object of the present invention is to provide an economic vehicle seat that is independent of the level of equipment specification of the vehicle and in which the neck rest is moved automatically in dependence on sensed parameters which take into account the body size of the user.

Through an electronics unit that is related to the seat, vehicle seats which have not yet been fitted, or have only in part been fitted, with adjustable components can be equipped or fitted out with a neck rest adjustment without the vehicle having to already be provided with a corresponding pre-installed electronics unit.

Advantageously, an electronics unit is provided for controlling all of the seat adjustment devices that are to be controlled, i.e. the seat has no further electronics unit. The apparatus and assembly costs are reduced through the central control of the seat adjustment device.

In an advantageous development of the invention, the electronics unit is equipped for a maximum number of functions of the seat and the associated functions are activated after connection to the corresponding adjustment devices. According to this so-called plug and play principle, the electronics unit detects which adjustment devices are connected, for example, the electric horizontal seat adjustment, and then activates corresponding programs. If in the relevant vehicle equipment specification other variations of adjustment devices are proposed, for example an electric seat height adjustment, then a correspondingly different program is started.

It is favorable if the sensor system is a constituent part of a seat adjustment device that is adjustable by an electric motor, because information on the adjustment can be obtained directly in this way. It is also conceivable that the sensor system is a constituent part of a manually displaceable seat adjustment device. Thus, for example, the seat position is detected in an optical manner and transmitted to the electronics unit. Similarly, sensing is also possible through a rotary potentiometer on an adjustment device.

Advantageously, the neck rest is adjustable in dependence on several moving adjustment devices, because in this way a redundancy, or increased accuracy, is possible when setting the neck rest height in relation to the seat user. From a combination of two or more settings of the seat it is possible to obtain more accurate information on the optimum neck rest position.

In one variation of the invention, the electronics unit is programmed so that an adjustment of the neck rest is carried out in dependence on seat adjustment devices, and more particularly in dependence on the horizontal seat adjustment LV. Since as a rule there is a direct dependence between leg length and body length, it can be assumed that when the seat is positioned close to the steering wheel a lower neck rest height is to be set. Consequently, an adjustment of the neck rest into an upper position proceeds accordingly when the seat is set further away from the steering wheel. As an alternative, or in combination with the above, the seat height adjustment HV is provided as a controlling adjustment device and here, as a rule, the neck rest is extended further out the further the seat is moved downwards.

In another advantageous embodiment of the invention, the mirror adjustment SP and/or vertical adjustment of the seat belt point and/or adjustment of the steering wheel, or a sensor detecting the position of the head are provided as controlling adjustment devices.

In a further development of the invention, different adjustment speeds of the neck rest are recorded in the electronics unit. Thus, for example during a, by necessity, rapid displacement, such as when folding the seat or backrest forwards, the corresponding position can be achieved in a short time while an adaption to the horizontal seat adjustment LV or in the case of a manual adjustment can only happen slowly for reasons of positioning accuracy. Favorable in this connection is the option where a soft stop program is recorded in the electronics unit in order to avoid or reduce loud stopping or impact noises and in order to improve the wear of the adjustment device.

More advantageously, the electronics unit is coupled to a seat occupancy detection unit so that an adjustment only takes place on those seats which are actually occupied.

It has proved favorable if the electronics unit is constructed on the basis of power semiconductors.

BRIEF DESCRIPTION OF THE DRAWINGS

The invention will now be explained in further detail with reference to the embodiments shown in the drawings in which.

DESCRIPTION

Figure 1:
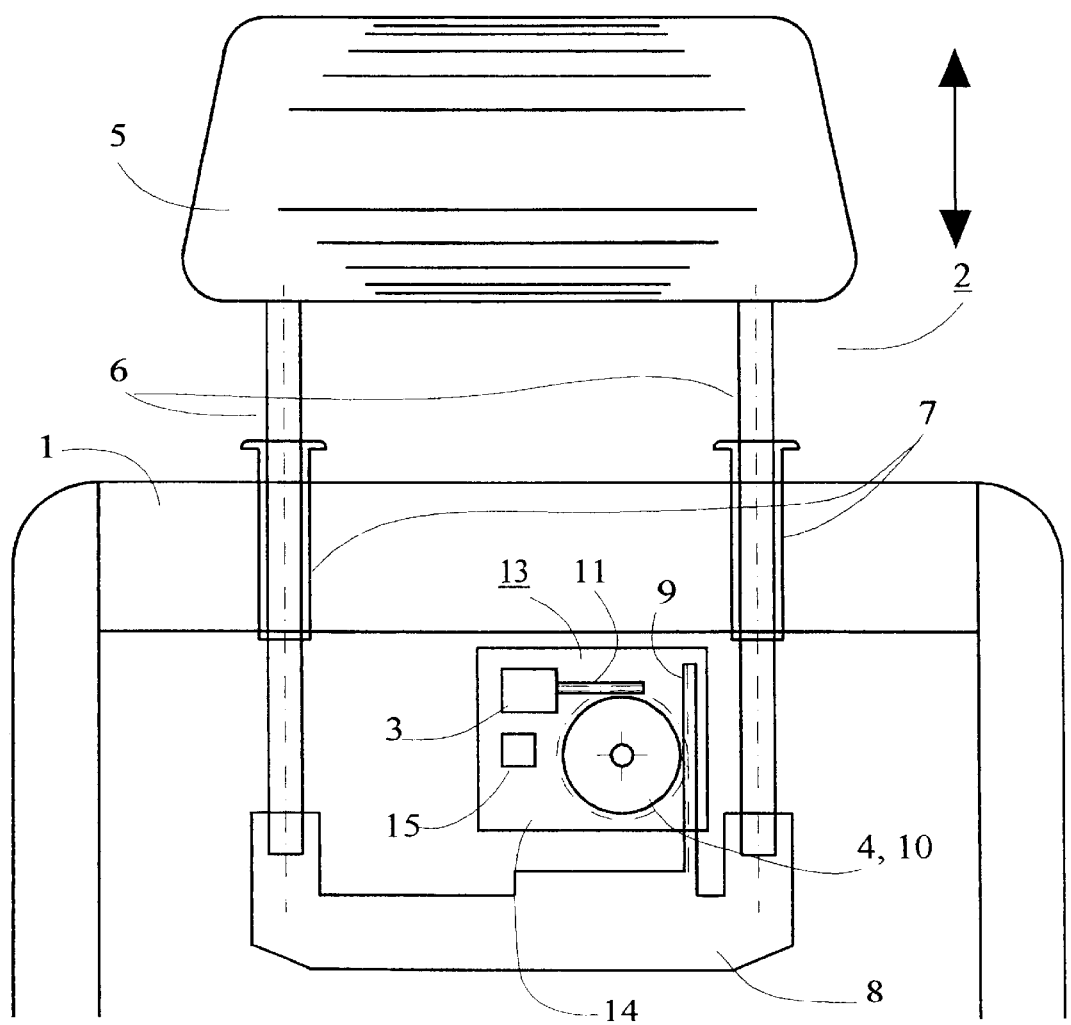
FIG. 1 shows a diagrammatic view of a seat backrest with a neck rest.

The diagrammatic sectional view in FIG. 1 shows a seat backrest 1 with a neck rest 2 that can be vertically adjusted through an electric motor 3 and gearing 4. The neck rest 2 consists of a neck rest body 5 and two parallel guide rods 6 that are guided longitudinally displaceable in guide sleeves 7. The guide sleeves 7 are let into the upper part of the seat back 1.

The guide rods 6 are fixed at their lower ends to a bridge 8 and are thereby connected together. A toothed rod 9 is formed on the bridge 8. The toothed rod 9 meshes with a worm wheel 10 which is driven by the motor 3 through a worm 11. The worm wheel 10 thereby functions as the gearing 4. Both the gearing 4 and the motor 3 are combined into one adjustment device 13, for example on a support element 14, and are fixed locally secured in the back rest 1. In one partially electrical design of the neck rest adjustment, the motor 12 may be moved by suitable operating means (not shown) in both rotary directions of the worm 11, and thus the neck rest 2 can be moved up or down in the direction of the arrow through the gearing 4 and toothed rod 9.

Likewise, an electronics unit is integrated in the adjustment device 13 and is connected to the motor 3 and sends corresponding control commands to the motor in dependence on sensed parameters. The sensors (not shown) detect parameters of adjustment devices which are altered in dependence on the body size of the seat occupant. A low position of the seat cushion height can infer, for example, that a relatively tall passenger is occupying the seat. Data detected in this way is forwarded to the electronics unit 15 which from these signals determines the optimum position of the neck rest 2 and controls the electric motor 3 accordingly.

Figure 2:
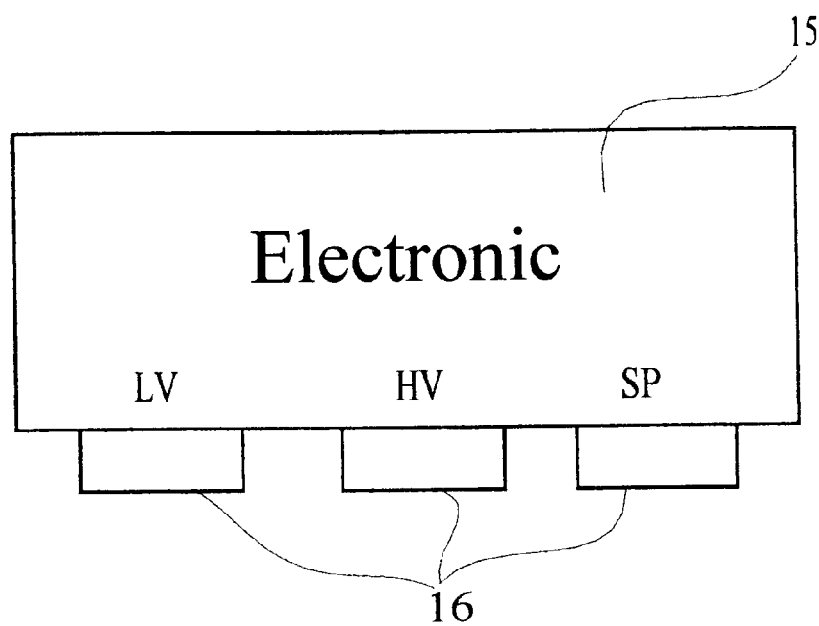
FIG. 2 shows a diagrammatic connection plan for an electronics unit.
Figure 2:
Figure 2:
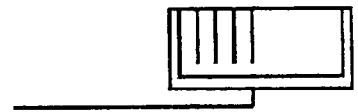
Figure 2:
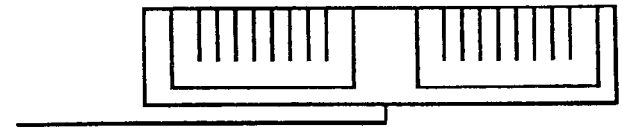
Figure 2:
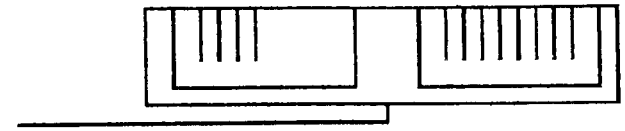

FIG. 2 shows an electronics unit 15 indicating, for example, how the plug and play principle is used within the scope of an automatic neck rest adjustment. Connection sites 16 are provided on the electronics unit for all the sensor devices and adjustment devices whose positions are used to determine the position of the head. The electronics unit is thus prepared for maximum equipment specification. The three connection possibilities 16 on the electronics unit 15 thus stand, for example, for a horizontal seat adjustment LV, a seat height adjustment HV, and a mirror adjustment SP.

Depending upon the type of equipment specification, different adjustment devices are provided in the vehicle which are operated either manually or by electric motor. The plugs 17 are connected with the connection sites 16 on the electronics unit 15 in dependence on the specification and fitting. In variation (a), the vehicle has an electric horizontal seat adjustment LV, but no seat height adjustment HV, or electric mirror adjustment SP. Corresponding to the plug fitting, the electronics unit 15 detects the connection as a horizontal seat adjustment LV and controls the electric motor 3 according to a detected seat position.

In variation (b), the adjustment of the seat in the longitudinal or horizontal direction is carried out manually and the position of the seat is determined through corresponding sensors, for example through rotary potentiometers or optical sensors. Analogous with variation (a), the setting of the neck rest 2 takes place in dependence on the sensed seat position.

In variation (c), an electric horizontal seat adjustment LV, and electric seat height adjustment HV, are provided so that the position of the neck rest 2 can be arrived at from the two detected parameters. Variation (d) shows a manual horizontal seat adjustment LV and an electric seat height adjustment HV as one example of the various types of sensed parameters that may be processed in the electronics unit 15.

A number of further combinations of sensed parameters is possible over and above those shown in variations (a) to (d) as previously described. Other possible values may be an incline of a backrest column, a length of the backrest column, data determined by cameras or other optical sensors, position detection through ultrasound and other sensors, or parameters of devices in or on the vehicle that are dependent on body size. Basically, the sensed parameters may be divided up into whether the position or setting of the head is measured or derived, for example, through a mirror adjustment SP or through ultrasound or optical sensors, or whether parameters are measured that exist in dependence on the body size of the seat user, for example, the horizontal seat length adjustment LV. The optimum setting of the neck rest is determined in the electronics unit 15 from this data.

A further possibility of converting sensed parameters lies in adjusting the neck rest 2 on the basis of the evaluation of a seat occupancy detection systems. In the event that one or more seat places in the vehicle are not occupied the neck rests 2 belonging to these may be moved into a lower position so that the driver has a better all round view.

Advantageously, the electronics unit 15 may be programmed within the scope of the final fitting. In this way a direct assignment may be made with each relevant vehicle model. Furthermore, a heat protection function may be integrated into the electronics unit 15 to guard against overloading the motor. This prevents the motor from burning out or the seat back from burning or catching fire.

The electronics unit 15 may be used to ensure that a constant adjustment speed for the various adjustment devices is possible even when the external conditions change, for example, in the event of wear in the case of adjusting the seat height or cold in the case of window lifters. The detrimental acoustics that are caused through modulating the drive are also avoided.

In some cases, it is necessary to carry out an adjustment at maximum speed, for example in the case of adjusting the neck rest 2 when folding the seat or backrest 1 forwards. This often arises when the fastest possible adjustment is required for moving into a lower position. To safeguard the mechanical components and reduce noise a soft stop program is provided in the electronics unit 15 with which the actual position which is detected, for example by a Hall sensor (not shown), is equated with the ideal position of the neck rest 2 and on approaching the ideal position the adjustment speed is reduced.

A similar application exists when moving back to a starting position. Through the soft stop program it is possible for the neck rest 2 to move back more or less precisely to the desired position.

Apart from the technological safety aspects, it is also possible through the integrated electronics unit 15 to set adjustment values specific for each vehicle, such as for example the adjustment stroke or adjustment force independently of the configuration of the neck rest 2. In the case of sports cars with small head room the maximum adjustment stroke is restricted by means of the electronics unit 15 without changes having to be made on the guide rods 6 or guide sleeves 7. It is thus possible with the electronics unit 15 to produce a one-piece neck rest that can be programmed for a specific model within the scope of final fitting and with which savings can be achieved by reducing the variety of parts.

In particular, vehicle seats already designed as partially electric may be subsequently fitted with the electronics unit 15 without problem and thus modified technologically with regard to safety. However, seats that are designed as non-electric may also be easily converted to automatic adjustment, because through the seat-related control, no technological control measures have to be provided on the part of the vehicle, and all the component parts required are combined in the adjustment device 13. Only the connections to the mains network and to the sensor system need be established to allow the neck rest adjustment to function.

It is apparent that apart from the automatic neck rest adjustment a separate adjustment of the neck rest through switches or by means of manual displacement is also possible.

What is claimed is:

1. An adjustable motor vehicle seat comprising:
   at least two seat adjustment devices of the group consisting of a horizontal seat adjustment device, a seat height adjustment device, a seat depth adjustment device, and a seat back incline adjustment device, the at least two seat adjustment devices are adjustable in dependence on a body size of a seat user;
   a plurality of sensor units influenced by the body size of a seat user, wherein the sensor units detect parameters of the at least two seat adjustment devices;
   a neck rest which is controlled in dependence on signals of the sensor units;
   a neck rest adjustment device having a motor combined with a gearing; and
   an electronics unit which evaluates the sensor signals of the sensor units and controls the neck rest adjustment device motor;
   wherein the electronics unit is mounted on the vehicle seat, is integrated into the neck rest adjustment device, and is connected mechanically to the motor through a supporting element;
   the electronics unit is configured to control a plurality of different electronic seat adjustment devices; and
   the electronics unit detects which electronic seat adjustment devices are present.

2. The adjustable motor vehicle seat according to claim 1 wherein the electronics unit controls all seat adjustment devices which are to be controlled.

3. The adjustable motor vehicle seat according to claim 2 wherein at least one of the sensor units is a constituent part of a manually adjustable seat adjustment device.

4. The adjustable motor vehicle seat according to claim 1 wherein at least one sensor unit is a constituent part of a seat adjustment device which can be adjusted by electric motor;
   and at least another sensor unit is a constituent part of a manually adjustable seat adjustment device.

5. The adjustable motor vehicle seat according to claim 1 wherein the electronics unit for the neck rest has at least two adjustment speeds; and wherein a faster speed serves for lowering the neck rest completely and a slower speed serves for adjusting the neck rest.

6. The adjustable motor vehicle seat according to claim 1 wherein the electronics unit comprises power semiconductors.

7. The adjustable motor vehicle seat according to claim 1 wherein the electronics unit is coupled to a seat occupancy detection system.

8. The adjustable motor vehicle seat according to claim 1 wherein the at least two seat adjustment devices are a horizontal seat adjustment device and a seat height adjustment device.

9. An adjustable motor vehicle seat comprising:
   at least one seat adjustment device of the group consisting of a horizontal seat adjustment device, a seat height adjustment device, a seat depth adjustment device, and a seat back incline adjustment device, the at least one seat adjustment device is adjustable in dependence on a body size of a seat user;
   a sensor unit influenced by the body size of a seat user, wherein the sensor unit detects a parameter of the at least one seat adjustment device;
   a neck rest which is controlled in dependence on signals of the sensor unit;
   a neck rest adjustment device having a motor combined with a gearing; and
   an electronics unit which evaluates the sensor signals of the sensor unit and controls the neck rest adjustment device motor;
   wherein the electronics unit is mounted on the vehicle seat, is integrated into the neck rest adjustment device, and is connected mechanically to the motor through a supporting element;
   the electronics unit for the neck rest has at least two adjustment speeds, a faster speed serves for lowering the neck rest completely and a slower speed serves for adjusting the neck rest; and
   the electronics unit moves the neck rest of a forward-folding seat or seat back down at a maximum available speed when the seat or seat back is folded forwards, and wherein the electronics unit moves the neck rest back into the original position when the seat is folded back.

10. An adjustable motor vehicle seat comprising:

at least one seat adjustment device of the group consisting of a horizontal seat adjustment device, a seat height adjustment device, a seat depth adjustment device, and a seat back incline adjustment device, the at least one seat adjustment device is adjustable in dependence on a body size of a seat user;

a sensor unit influenced by the body size of a seat user, wherein the sensor unit detects a parameter of the at least one seat adjustment device;

a neck rest which is controlled in dependence on signals of the sensor unit;

a neck rest adjustment device having a motor combined with a gearing; and an electronics unit which evaluates the sensor signals of the sensor unit and controls the neck rest adjustment device motor;

wherein the electronics unit is mounted on the vehicle seat, is integrated into the neck rest adjustment device, and is connected mechanically to the motor through a supporting element;

the electronics unit for the neck rest has at least two adjustment speeds, a faster speed serves for lowering the neck rest completely and a slower speed serves for adjusting the neck rest; and the electronics unit provides a soft stop when the neck rest is rapidly lowered.

11. A motor vehicle comprising:

an adjustable motor vehicle seat having:
  at least one seat adjustment device of the group consisting of a horizontal seat adjustment device, a seat height adjustment device, a seat depth adjustment device, and a seat back incline adjustment device, the at least one seat adjustment device is adjustable in dependence on a body size of a seat user;
  a sensor unit influenced by the body size of a seat user; wherein the sensor unit detects a parameter of the at least one seat adjustment device;
  a neck rest which is controlled in dependence on signals of the sensor unit;
  a neck rest adjustment device having a motor combined with a gearing; and
  an electronics unit which evaluates the sensor signals of the sensor unit and controls the neck rest adjustment device; and at least one of the group consisting of a mirror adjustment, a height adjustment of a seat belt point, a steering wheel adjustment, and a sensor detecting the position of the head; and wherein the electronics unit is mounted on the vehicle seat, is integrated into the neck rest adjustment device, and is connected mechanically to the motor through a supporting element;

wherein the neck rest is adjustable in dependence on a plurality of seat adjustment devices; and wherein the neck rest adjustment device is adjustable in dependence on the at least one of the group consisting of a mirror adjustment, a height adjustment of a seat belt point, a steering wheel adjustment, and a sensor detecting the position of the head.

12. An adjustable motor vehicle seat comprising:

at least one seat adjustment device of the group consisting of a horizontal seat adjustment device, a seat height adjustment device, a seat depth adjustment device, and a seat back incline adjustment device, the at least one seat adjustment device is adjustable in dependence on a body size of a seat user;

a sensor unit influenced by the body size of a seat user, wherein the sensor unit detects a parameter of the at least one seat adjustment device;

a neck rest which is controlled in dependence on signals of the sensor unit;

a neck rest adjustment device having a motor combined with a gearing; and an electronics unit which evaluates the sensor signals of the sensor unit and controls the neck rest adjustment device motor;

wherein the electronics unit is mounted on the vehicle seat, is integrated into the neck rest adjustment device, and is connected mechanically to the motor through a supporting element;

the electronics unit moves the neck rest of a forward-folding seat or seat back down at a maximum available speed when the seat or seat back is folded forwards, and wherein the electronics unit moves the neck rest back into the original position when the seat is folded back; and the electronics unit provides a soft stop when the neck rest is rapidly lowered.

* * * * *